US010032410B2

(12) United States Patent
Takasugi et al.

(10) Patent No.: US 10,032,410 B2
(45) Date of Patent: Jul. 24, 2018

(54) ORGANIC LIGHT EMITTING DISPLAY APPARATUS PERFORMING A SENSING FOR AN EXTERNAL COMPENSATION

(71) Applicant: LG Display Co., Ltd., Seoul (KR)

(72) Inventors: Shinji Takasugi, Gyeonggi-do (KR); Joong Sun Yoon, Gyeonggi-do (KR); Min Kyu Chang, Incheon (KR); Hyo Jin Park, Jeollanam-do (KR); Jeong Pyo Lee, Gyeonggi-do (KR); Chang Woo Seok, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 44 days.

(21) Appl. No.: 14/792,757

(22) Filed: Jul. 7, 2015

(65) Prior Publication Data

US 2016/0005354 A1 Jan. 7, 2016

(30) Foreign Application Priority Data

Jul. 7, 2014 (KR) ........................ 10-2014-0084562

(51) Int. Cl.

| | |
|---|---|
| ***G09G 3/32*** | (2016.01) |
| ***G06T 5/00*** | (2006.01) |
| ***G09G 3/3233*** | (2016.01) |
| ***G09G 3/3291*** | (2016.01) |

(52) U.S. Cl.

CPC ......... *G09G 3/3233* (2013.01); *G09G 3/3291* (2013.01); *G09G 2300/0842* (2013.01); *G09G 2320/0295* (2013.01); *G09G 2320/043* (2013.01)

(58) Field of Classification Search

CPC ............... G09G 3/3291; G09G 3/3233; G09G 2320/0295; G09G 2320/043; G09G 2300/0842

See application file for complete search history.

(56) References Cited

U.S. PATENT DOCUMENTS

2004/0208384 A1* 10/2004 Lin ........................ H04N 7/012 382/254
2006/0007206 A1* 1/2006 Reddy ................. G06F 3/03542 345/204
2008/0186325 A1* 8/2008 Higgins ................ G06T 11/001 345/592
2009/0066614 A1* 3/2009 Ishii ..................... G09G 3/3275 345/76

(Continued)

FOREIGN PATENT DOCUMENTS

CN 101477783 A 7/2009
CN 103903561 A 7/2014

(Continued)

OTHER PUBLICATIONS

Office Action dated Apr. 6, 2017 from the State Intellectual Property Office of the People's Republic of China in counterpart Chinese application No. 201510551138.5.

*Primary Examiner* — Kwang-Su Yang
(74) *Attorney, Agent, or Firm* — Morgan, Lewis & Bockius LLP

(57) ABSTRACT

Disclosed is a display apparatus. The display apparatus performs external compensation by using sensing data generated through actual sensing and calculation data which is calculated based on the sensing data with a median filter.

5 Claims, 13 Drawing Sheets

(56) References Cited

U.S. PATENT DOCUMENTS

| | | | | |
|---|---|---|---|---|
| 2009/0174628 | A1* | 7/2009 | Wang | G09G 3/3225 345/76 |
| 2011/0122119 | A1 | 5/2011 | Bae et al. | |
| 2012/0076432 | A1 | 3/2012 | Park et al. | |
| 2013/0147694 | A1 | 6/2013 | Kim et al. | |
| 2014/0176516 | A1 | 6/2014 | Kim et al. | |
| 2015/0339984 | A1* | 11/2015 | Hyun | G09G 3/3225 345/207 |

FOREIGN PATENT DOCUMENTS

| | | | |
|---|---|---|---|
| KR | 10-2009-0018012 | A | 2/2009 |
| KR | 10-2012-0032132 | A | 4/2012 |
| KR | 10-2013-0066449 | A | 6/2013 |
| KR | 10-2014-0076085 | A | 6/2014 |
| KR | 10-2015-0064460 | A | 6/2015 |
| KR | 10-2015-0065026 | A | 6/2015 |

* cited by examiner (a)

(b)

(a)

(b)

ORGANIC LIGHT EMITTING DISPLAY APPARATUS PERFORMING A SENSING FOR AN EXTERNAL COMPENSATION

CROSS-REFERENCE TO RELATED APPLICATIONS

This application claims the benefit of the Korean Patent Application No. 10-2014-0084562 filed on Jul. 7, 2014, which is hereby incorporated by reference as if fully set forth herein.

BACKGROUND

Field of the Invention

The present invention relates to a method of driving a display apparatus, and more particularly, to a display apparatus for performing external compensation through a sensing line.

Discussion of the Related Art

A flat panel display (FPD) apparatus is applied to various electronic devices such as portable phones, tablet personal computers (PCs), notebook computers, monitors, etc. Examples of the FPD apparatus include liquid crystal display (LCD) apparatuses, plasma display panel (PDP) apparatuses, organic light emitting display apparatuses, etc. Recently, electrophoretic display (EPD) apparatuses are being widely used as one type of the FPD device.

In the display apparatuses, the organic light emitting display apparatuses use a self-emitting apparatus and thus have a fast response time, high emission efficiency, high luminance, and a wide viewing angle.

The organic light emitting display apparatuses are self-emitting apparatuses where an organic light emitting diode (OLED) emits light through a recombination of an electron and a hole to display an image, and have a fast response time and low consumption power. Since the organic light emitting display apparatuses use a self-emitting device, the organic light emitting display apparatuses have an excellent viewing angle. Therefore, the organic light emitting display apparatuses are attracting much attention as next-generation FPD apparatuses.

However, in a related art organic light emitting display apparatus, a deviation of characteristics such as a threshold voltage (Vth) and a mobility of a driving transistor occurs in each of a plurality of pixels due to causes such as a process differential, deterioration, and/or the like. Therefore, the amounts of currents for driving a plurality of OLEDs differ, and for this reason, a luminance deviation between pixels occurs.

To solve such a problem, an external compensation method that corrects input image data to compensate for a characteristic change of a driving transistor included in each pixel is disclosed in Korean Patent Publication No. 10-2013-0066449 (hereinafter referred to as a prior art reference).

FIG. 1 is an exemplary diagram for describing a method of performing sensing for external compensation in a related art organic light emitting display apparatus.

A plurality of pixels should be continuously sensed for performing external compensation.

For example, when red pixels, white pixels, green pixels, and blue pixels are provided on one horizontal line n, the related art organic light emitting display apparatus first senses and stores threshold voltages or mobility of the red pixels as illustrated in portion (a) of FIG. 1, subsequently senses and stores threshold voltages or mobility of the white pixels as illustrated in portion (b) of FIG. 1, subsequently senses and stores threshold voltages or mobility of the green pixels as illustrated in portion (c) of FIG. 1, and finally senses and stores threshold voltages or mobility of the blue pixels as illustrated in portion (d) of FIG. 1. Subsequently, related art organic light emitting display apparatus repeats the above-described operation on a plurality of pixels which are provided on a next horizontal line.

However, as a size of a panel is enlarged and the image quality of the panel is far more sharpened, a period which is required for sensing characteristics (threshold voltages or mobility) of the pixels is progressively increasing.

For example, 2,160 horizontal lines are provided in a panel applied to an ultra-high definition (UHD) display apparatus, and when the panel is configured with red (R), green (G), blue (B), and white (W) pixels, 15,360 (=3840×4) pixels are provided on one horizontal line.

In this case, sensing is performed 8,640 (=2160 lines×4) times for sensing all pixels provided in a whole panel by using a method illustrated in FIG. 1.

Therefore, in the panel, a long period is required for sensing all the pixels.

Generally, the sensing operation is performed during a blank time between frames or when a display apparatus is turned off. Therefore, when the sensing period becomes longer, it is difficult to sense all pixels during the blank time. Also, even when the display apparatus is turned off, it is difficult to normally sense all the pixels. When the blank time becomes longer, a period where an image is displayed becomes shorter, causing the degradation in image quality. For this reason, it is difficult to increase the blank time depending on the sensing period.

FIG. 2 is an exemplary diagram for describing a method of calculating a sensing value of a pixel, where sensing is not performed, by using an mean value in an organic light emitting display apparatus.

As described above, as a size of a panel is enlarged and the image quality of the panel is far more sharpened, a sensing period for sensing characteristics of all pixels increases. For this reason, it is difficult to sense the characteristics of all the pixels during a limited period.

To solve such a problem, a method of calculating a sensing value illustrated in FIG. 2 has been proposed.

For example, as illustrated in FIG. 2, sensing is substantially performed for four pixels, and sensing values are collected. Sensing is not performed for one pixel (hereinafter simply referred to as a non-sensing pixel) surrounded by the four pixels (hereinafter simply referred to as sensing pixels). In this case, a sensing value of the non-sensing pixel is calculated based on an mean value of the sensing pixels.

However, as illustrated in FIG. 2, when at least one of the sensing pixels is a defective pixel, the sensing value of the non-sensing pixel is large in error.

For example, in a case where a sensing value of 500±100 is a sensing value of a normal pixel and a sensing value of a defective pixel which is not normally driven is 0, although the non-sensing pixel in the middle of the sensing pixels is a normal pixel, when a related art method of calculating a sensing value by using an mean value is applied, a sensing value of the non-sensing pixel is calculated as 383.

Therefore, although an actual compensation value is within a range of 500±100, the non-sensing pixel is compensated for by an abnormal external compensation value, and for this reason, the non-sensing pixel is abnormally driven.

SUMMARY

Accordingly, the present invention is directed to a display apparatus that substantially obviates one or more problems due to limitations and disadvantages of the related art.

An object of the present invention is to provide a display apparatus that performs external compensation by using sensing data generated through actual sensing and calculation data which is calculated based on the sensing data with a median filter.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an organic light emitting display apparatus comprises a panel where a plurality of subpixels configuring a unit pixel are provided on each of a plurality of horizontal lines, and sensing for external compensation is performed for each horizontal line; a sensing unit configured to, when a sensing period arrives, perform the sensing for the external compensation for each horizontal line of the panel to collect sensing data including characteristic information of the plurality of subpixels; a calculator configured to calculate, by using a median filter, calculation data including characteristic information of a non-sensing subpixel which is not sensed among the plurality of subpixels, based on the sensing data and calculate an external compensation value, based on the sensing data and the calculation data; a data aligner configured to, when input image data corresponding to a subpixel for which the external compensation is not required is received, realign the input image data to generate normal image data and, when input image data corresponding to a subpixel for which the external compensation is required is received, compensate for the input image data to generate compensation image data, based on the external compensation value; and a data driver configured to convert the normal image data into a normal data voltage, convert the compensation image data into a compensation data voltage, and supply the normal data voltage and the compensation data voltage to a plurality of data lines provided in the panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, exemplary embodiments of the present invention will be described in detail with reference to the accompanying drawings. The present invention may be applied to various kinds of display apparatuses where external compensation is performed. In this disclosure, for convenience of a description, an OLED display apparatus will be described as an example of the present invention.

Figure 1:
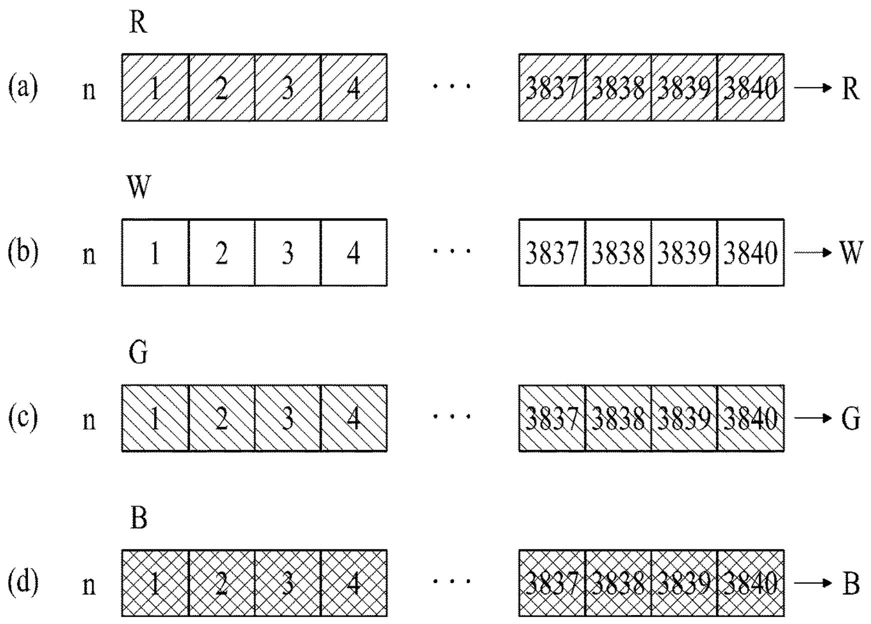
FIG. 1 Prior Art
FIG. 1 is an exemplary diagram for describing a method of performing sensing for external compensation in a related art organic light emitting display apparatus.
Figure 2:
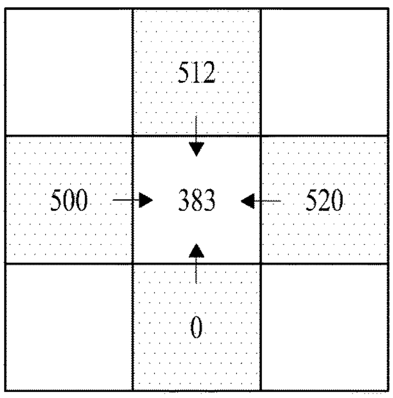
FIG. 2 Prior Art
FIG. 2 is an exemplary diagram for describing a method of calculating a sensing value of a pixel, where sensing is not performed, by using an mean value in an organic light emitting display apparatus.
Figure 3:
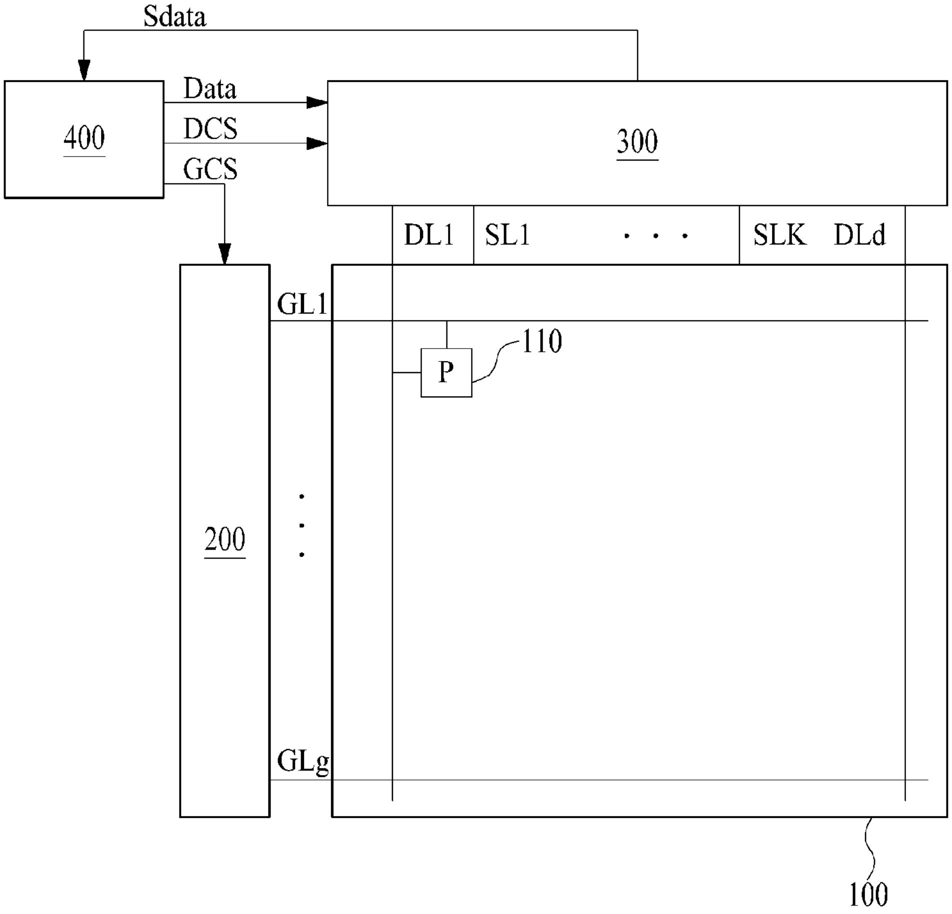
FIG. 3 is an exemplary diagram schematically illustrating a configuration of an organic light emitting display apparatus according to an example embodiment of the present invention.
Figure 4:
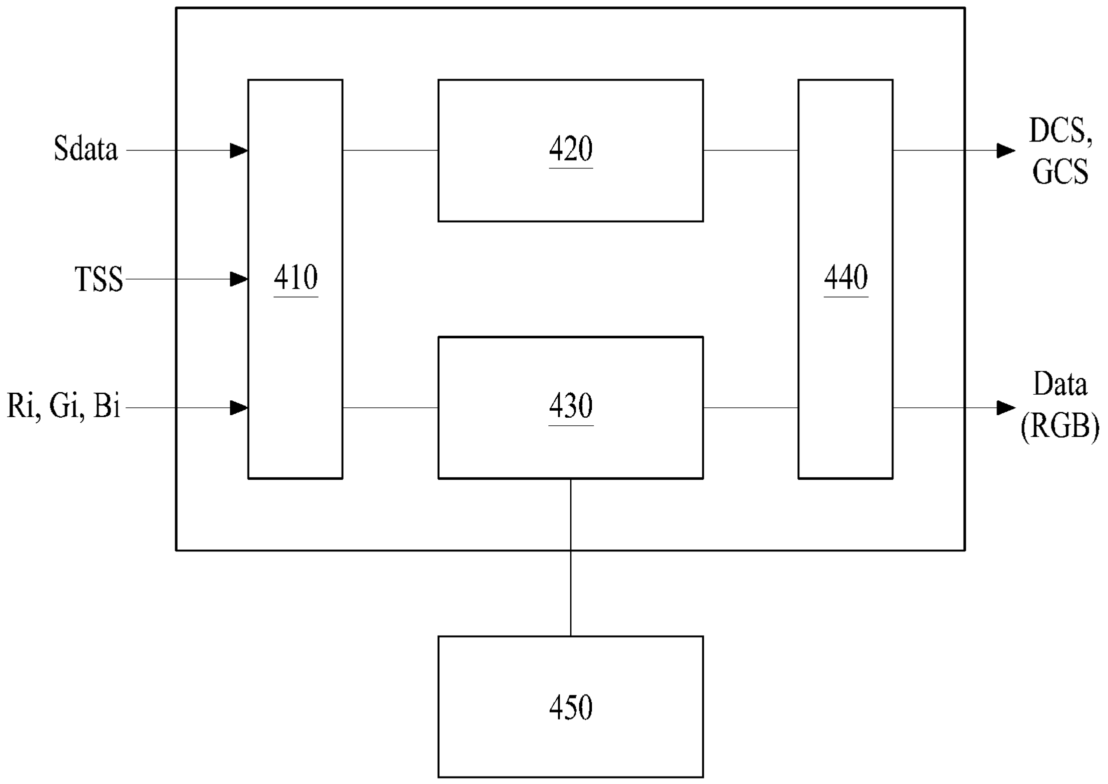
FIG. 4 is an exemplary diagram illustrating a configuration of a controller applied to an organic light emitting display apparatus according to an example embodiment of the present invention.
Figure 5:
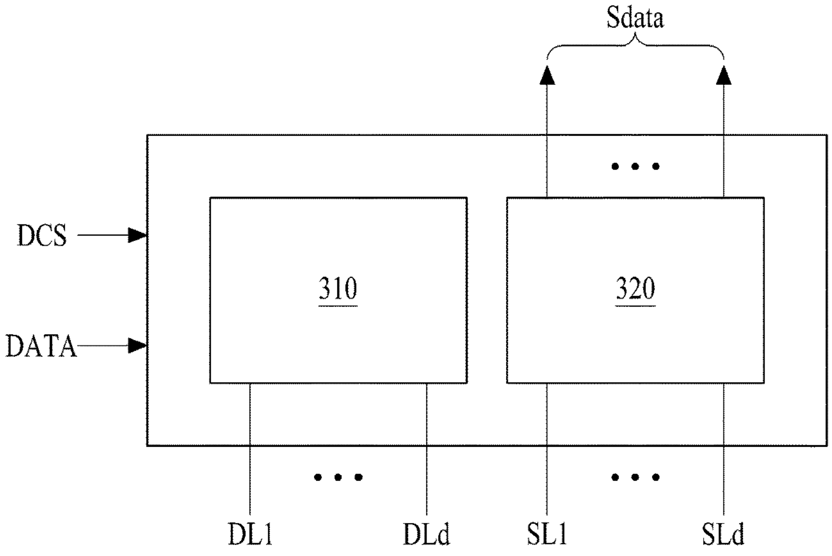
FIG. 5 is an exemplary diagram illustrating a configuration of a data driver applied to an organic light emitting display apparatus according to an example embodiment of the present invention.
Figure 6:
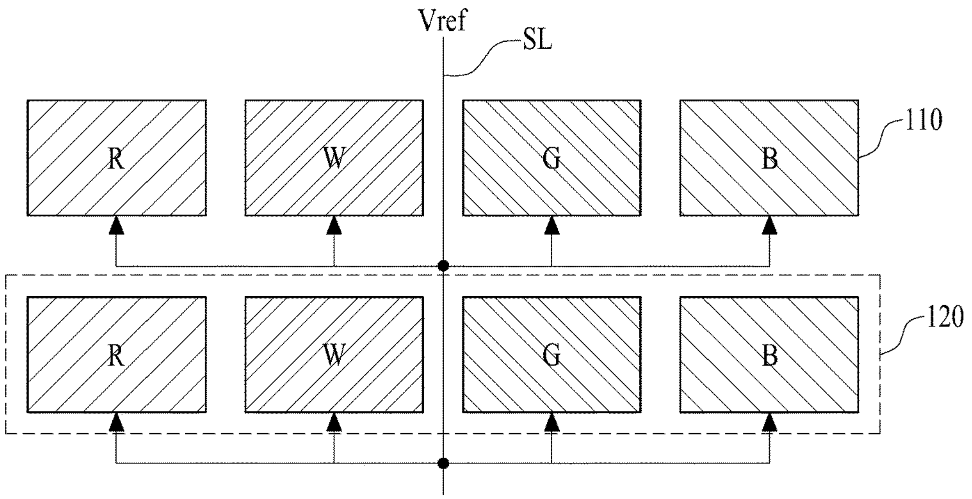
FIG. 6 is an exemplary diagram illustrating a structure of a plurality of pixels provided in a panel applied to an organic light emitting display apparatus according to an example embodiment of the present invention.
Figure 7:
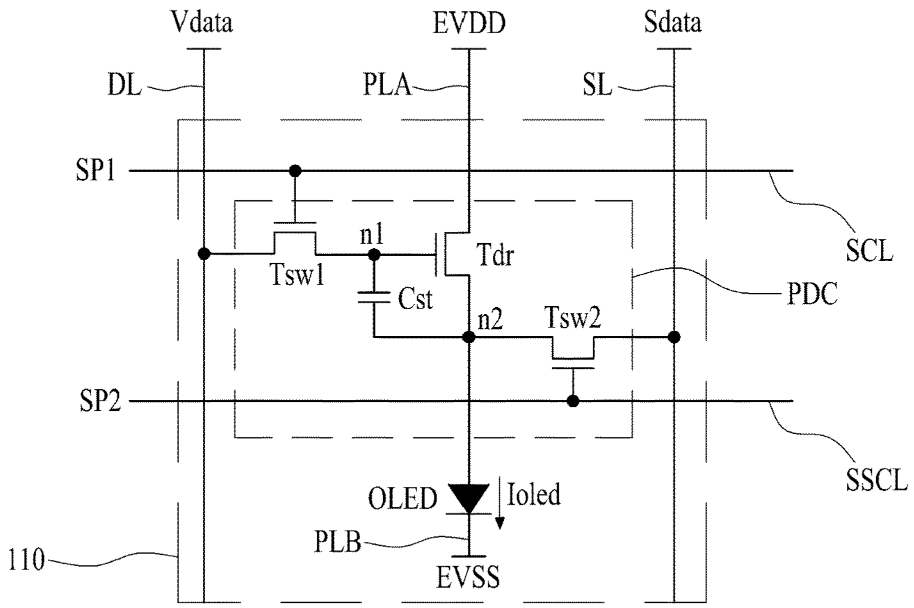
FIG. 7 is an exemplary diagram illustrating a structure of a pixel provided in a panel applied to an organic light emitting display apparatus according to an example embodiment of the present invention.

FIG. 3 is an exemplary diagram schematically illustrating a configuration of an organic light emitting display apparatus according to an example embodiment of the present invention. FIG. 4 is an exemplary diagram illustrating a configuration of a controller applied to an organic light emitting display apparatus according to an example embodiment of the present invention. FIG. 5 is an exemplary diagram illustrating a configuration of a data driver applied to an organic light emitting display apparatus according to an example embodiment of the present invention. FIG. 6 is an exemplary diagram illustrating a structure of a plurality of pixels provided in a panel applied to an organic light emitting display apparatus according to an example embodiment of the present invention. FIG. 7 is an exemplary diagram illustrating a structure of a pixel provided in a panel applied to an organic light emitting display apparatus according to an example embodiment of the present invention.

Generally, sensing for real-time external compensation is performed by using a blank time or a period (hereinafter simply referred to as a turn-off time) where a display apparatus is turned off. Here, the sensing is performed for each of a plurality of subpixels, and particularly, a threshold voltage (Vth) or a mobility of each subpixel is sensed. However, as a panel enlarges in size and becomes higher in definition, a period (hereinafter simply referred to as a sensing period) for the sensing increases, and thus, it is difficult for the sensing period to be added into the blank time or the turn-off time.

To solve such a problem, the present invention collects sensing data which is obtained by sensing characteristics (for example, threshold voltages, mobility, and/or the like) of some of a plurality of subpixels provided in a panel, and calculates calculation data including characteristic information of the other subpixels, based on the collected sensing data. The present invention compensates for a data voltage supplied to a pixel of the panel, based on the sensing data and the calculation data.

Hereinafter, a subpixel denotes a pixel that emits red light, green light, blue light, or white light. However, the subpixel may be divided by a color filter.

A unit pixel is configured with a plurality of subpixels and emits white light. For example, the unit pixel may be configured with a red subpixel, a green subpixel, and a blue subpixel, or may be configured with a red subpixel, a green subpixel, a blue subpixel, and a white subpixel.

A sensing subpixel denotes a subpixel of which characteristic is sensed. Data (i.e., data including a change amount or information (hereinafter simply referred to as characteristic information) of the characteristic) obtained through sensing of the sensing subpixel is referred to as sensing data.

A non-sensing subpixel denotes a subpixel of which characteristic is not directly sensed.

The calculation data is calculated based on the sensing data with a median filter and includes the characteristic information of the non-sensing subpixel.

A horizontal line is a virtual line which is disposed in a direction vertical to a data line. The horizontal line may correspond to one gate line. A plurality of subpixels are provided on one horizontal line.

The organic light emitting display apparatus according to an example embodiment of the present invention, as illustrated in FIGS. 3 to 7, may include: a panel 100 where a plurality of subpixels 110 configuring a unit pixel 120 are provided on each of a plurality of horizontal lines, and sensing for external compensation is performed for each horizontal line; a sensing unit 320 that, when a sensing period arrives, performs the sensing for the external compensation for each horizontal line of the panel 100 to collect sensing data Sdata including characteristic information of the plurality of subpixels 110; a calculator 410 that calculates, by using a median filter, calculation data including characteristic information of a non-sensing subpixel which is not sensed among the plurality of subpixels, based on the sensing data and calculates an external compensation value, based on the sensing data and the calculation data; a data aligner 430 that, when input image data corresponding to a subpixel 110 for which the external compensation is not required is received, realigns the input image data to generate normal image data and, when input image data corresponding to a subpixel 110 for which the external compensation is required is received, compensates for the input image data to generate compensation image data, based on the external compensation value; and a data driver 300 that converts the normal image data into a normal data voltage, converts the compensation image data into a compensation data voltage, and supplies the normal data voltage and the compensation data voltage to a plurality of data lines provided in the panel 100. Here, a generic name for the sensing unit 320, the calculator 410, the data aligner 430, the data driver 300, and a gate driver 200 is a panel driver.

First, as illustrated in FIG. 7, the panel 100 may include the plurality of subpixels 110, which each include an organic light emitting diode OLED and a pixel driving circuit PDC including a driving transistor Tdr that controls a current flowing in the organic light emitting diode OLED, and a plurality of signal lines that define a plurality of pixel areas, where the plurality of subpixels 110 are respectively provided, and supply a driving signal to the pixel driving circuit PDC.

The signal lines may include a scan control line SCL, a sensing control line SSCL, a data line DL, a sensing line SL, a first driving power line PLA, and a second driving power line PLB.

A plurality of the scan control lines SCL may be arranged in parallel at certain intervals along a second direction (i.e., a horizontal direction) of the panel 100.

The plurality of sensing control line SSCL may be arranged at certain intervals in parallel with the scan control line SCL. Also, the scan control line and the sensing control line may be provided as one line.

A plurality of data lines DL may be arranged in parallel at intervals along a first direction (i.e., a vertical direction) of the panel 100 to intersect the scan control line SCL and the sensing control line SSCL.

A plurality of the sensing lines SL may be arranged at intervals in parallel with the data lines DL.

At least three subpixels 110 may configure one unit pixel 120. In the following description, a case where three subpixels 110 (for example, a red subpixel R, a green subpixel G, and a blue subpixel B) configure one unit pixel 120 or a case where four subpixels 110 (for example, a red subpixel R, a white subpixel W, a green subpixel G, and a blue subpixel B) configure one unit pixel 120 as illustrated in FIG. 6 will be described as an example of the present invention. In this case, one sensing line may be provided in the unit pixel 120. Therefore, when d number of data lines DL1 to DL4 are provided on a horizontal line of the panel 100, the number of the sensing lines SL may be d/3 or d/4.

To provide an additional description, the data lines DL may be provided in the first direction (the vertical direction)

of the panel 100, and the sensing lines SL may be arranged in parallel with the data lines DL. Each of the sensing lines SL, as illustrated in FIG. 6, may be connected to at least three subpixels 110 configuring each of a plurality of unit pixels 120 that are provided on one horizontal line.

A plurality of the first driving power lines PLA may be arranged at intervals in parallel with the data line DL. Here, the plurality of the first driving power lines PLA may be arranged at intervals in parallel with the sensing line SL. The first driving power line PLA may be connected to a driving power supply unit (not shown) and may supply a first driving voltage ELVDD, supplied from the driving power supply unit (not shown), to each of the plurality of pixels P.

A plurality of the second driving power lines PLB may be provided all over the panel 100 in a one-piece form or may be arranged at intervals in parallel with the data lines DL1 to DLd or the scan control lines SL1 to SLk. The second driving power line PLB may supply a second driving voltage ELVSS, supplied from the driving power supply unit, to each of the plurality of pixels P. Optionally, the second driving power line PLB may be electrically grounded to a case (or a cover which is formed of a metal material and configures the OLED display apparatus, and in this case, the second driving power line may supply a ground voltage (a ground) to each of the plurality of pixels P.

The plurality of pixels P may be respectively provided in a plurality of pixel areas defined by the plurality of scan control lines SCL and the plurality of data lines DL1 to DLd which intersect each other. Here, each of the plurality of pixels P may be one of a red pixel, a green pixel, a blue pixel, and a white pixel.

The one unit pixel 120, as illustrated in FIG. 6, may include a red subpixel, a white subpixel, a green subpixel, and a blue subpixel which are adjacent to each other, or include a red subpixel, a green subpixel, and a blue subpixel which are adjacent to each other. That is, in FIG. 6, the unit pixel 120 configured with a red subpixel R, a white subpixel W, a green subpixel G, and a blue subpixel B are illustrated as two.

Each of the plurality of subpixels P, as illustrated in FIG. 7, may include the pixel driving circuit PDC and the organic light emitting diode OLED.

The pixel driving circuit PDC may include a first switching transistor Tsw1, a second switching transistor Tsw2, a driving transistor Tdr, and a capacitor Cst. Here, each of the transistors Tsw1, Tsw2 and Tdr may be a thin film transistor (TFT), and for example, may be an amorphous silicon (a-Si) TFT, a poly-Si TFT, an oxide TFT, an organic TFT, or the like.

The first switching transistor Tsw1 may be turned on by a first scan pulse SP1 and may output a data voltage Vdata supplied through the data line DL. To this end, the first switching transistor Tsw1 may include a gate electrode connected to the scan control line SCL adjacent thereto, a first electrode connected to the data line DL adjacent thereto, and a second electrode connected to a first node n1 which is a gate electrode of the driving transistor Tdr.

The second switching transistor Tsw2 may be turned on by a second scan pulse SP2 and may output a reference voltage Vref, supplied through the sensing line SL, to a second node n2 which is a source electrode of the driving transistor Tdr. To this end, the second switching transistor Tsw2 may include a gate electrode connected to the sensing control line SSCL adjacent thereto, a first electrode connected to the sensing line SL adjacent thereto, and a second electrode connected to the second node n2.

The capacitor Cst may include the gate electrode and a first electrode of the driving transistor Tdr, namely, electrodes respectively connected to the first node n1 and the second node n2. A first electrode of the capacitor Cst may be connected to the first node n1, and a second electrode of the capacitor Cst may be connected to the second node n2. The capacitor Cst may be charged with a difference voltage between a voltage, which is supplied to the first node n1 according to the first switching transistor Tsw1 being turned on, and a voltage which is supplied to the second node n2 according to the second switching transistor Tsw2 being turned on. The driving transistor Tdr may be turned on according to a voltage charged into the capacitor Cst.

The driving transistor Tdr may be turned on by the voltage of the capacitor Cst and may control an amount of current which flows from the first driving power line PLA to the organic light emitting diode OLED. To this end, the driving transistor Tdr may include the gate electrode connected to the first node n1, the first electrode connected to the second node n2, and a second electrode connected to the first driving power line PLA.

The organic light emitting diode OLED may emit light with a data current Ioled supplied from the driving transistor Tdr to output the light having luminance corresponding to the data current Ioled. To this end, the organic light emitting diode OLED may include a first electrode (for example, an anode electrode) connected to the second node n2 (i.e., the first electrode of the driving transistor Tdr), an organic layer (not shown) disposed on the first electrode, and a second electrode (for example, a cathode electrode) connected to the organic layer. The second electrode of the organic light emitting diode OLED may be the second driving power line PLB which is provided on the organic layer, or may be additionally provided on the organic layer to be connected to the second driving power line PLB.

Hereinabove, a structure of the subpixel 110 for performing external compensation has been described with reference to FIG. 7. However, the subpixel 110 may be provided in various structures in addition to the structure illustrated in FIG. 7.

For example, the external compensation may denote that a change amount of a threshold voltage or a mobility of the driving transistor Tdr included in the subpixel 110 is calculated, and a level of a data voltage supplied to a unit pixel is varied based on the change amount. Therefore, the structure of the subpixel 110 may be changed to various types so as to calculate the change amount of the threshold voltage or mobility of the driving transistor Tdr.

Moreover, to perform external compensation, a method of calculating the change amount of the threshold voltage or mobility of the driving transistor Tdr by using the subpixel 100 may also be variously changed depending on the structure of the subpixel 110.

To provide an additional description, the present invention relates to an organic light emitting display apparatus for performing external compensation, and in detail, the present invention performs sensing for external compensation for only some subpixels (for example, a sensing subpixel) and calculates characteristic information of a subpixel (for example, a non-sensing subpixel) where sensing is not performed, based on sensing data obtained from the sensing subpixel. In this case, a structure of a subpixel for external compensation may use various structures of a subpixel which are proposed for external compensation at present, and a method of performing external compensation may use various external compensation methods which are proposed for external compensation at present. For example, the structure of the subpixel for external compensation and the method of performing external compensation may respectively use structures and methods disclosed in a number of patent documents, for example, Korean Patent Publication No. 10-2013-0066449, and may respectively use structures and methods disclosed in Korean Patent Publication Nos. 10-2015-0065026 and 10-2015-0064460 filed by the applicant.

That is, a detailed structure of a subpixel for performing external compensation and a detailed external compensation method depart from the scope of the present invention. Therefore, an example of a subpixel for external compensation has been described in brief with reference to FIG. 7, and an external compensation method will be described below in brief.

Second, the panel driver may operate the panel 100 in a sensing mode or a display mode.

The sensing mode may be performed at every period set by a use, at every blank time where an image is not displayed, or at every turn-off time. In the sensing mode, sensing may be sequentially performed for each horizontal line. A period where the sensing is performed in the sensing mode may be referred to as a sensing period. In the sensing mode, an external compensation value for correcting a characteristic change of the driving transistor Tdr may be calculated.

In the display mode, an image may be displayed by the panel 100. In the display mode, the input image data may be converted into external compensation image data by using the external compensation value, and an external compensation data voltage corresponding to the external compensation image data may be supplied to the panel 100 through the data line DL. Input image data corresponding to a subpixel for which external compensation is not required may be realigned as normal image data, and the normal image data may be converted into a normal data voltage and may be supplied to the panel 100 through a corresponding data line.

In the sensing mode, the panel driver may sense a characteristic change (for example, a threshold voltage and/or mobility) of the driving transistor Tdr included in each subpixel P through each of first to kth sensing lines SL1 to SLk to generate sensing data Sdata including characteristic information of the driving transistor Tdr.

The panel driver may calculate the external compensation value, based on the sensing data Sdata and correct input image data Ri, Gi and Bi supplied from an external system (not shown) by using the external compensation value to generate the external compensation image data. The panel driver may convert the external compensation image data DATA into a data voltage and supply the data voltage to a corresponding subpixel P.

For example, to separately compensate for characteristic changes of the driving transistors Tdr included in the respective subpixels P, the panel driver may respectively sense the characteristic changes of the driving transistors Tdr through the sensing lines SL1 to SLk, compensate for the input image data Ri, Gi and Bi by using the sensed characteristic changes of the driving transistors Tdr to generate external compensation image data, convert the generated external compensation image data into external compensation data voltages, and supply the external compensation data voltages to the respective subpixels P.

The panel driver may include: the sensing unit 320 that, when a sensing period arrives, performs the sensing for the external compensation for each horizontal line of the panel 100 to collect sensing data Sdata including characteristic information of the plurality of subpixels 110; the calculator 410 that calculates, by using the median filter, calculation data including characteristic information of a non-sensing subpixel which is not sensed among the plurality of subpixels, based on the sensing data and calculates an external compensation value, based on the sensing data and the calculation data; and the data aligner 430 that, when input image data corresponding to a subpixel 110 for which the external compensation is not required is received, realigns the input image data to generate normal image data and, when input image data corresponding to a subpixel 110 for which the external compensation is required is received, compensates for the input image data to generate compensation image data, based on the external compensation value; and the data driver 300 that converts the normal image data into a normal data voltage, converts the compensation image data into a compensation data voltage, and supplies the normal data voltage and the compensation data voltage to a plurality of data lines provided in the panel 100; and a gate driver 200 that supplies a first scan pulse SP1 and a second scan pulse SP2 to the scan control lines SCL and the sensing control lines SSCL. The data aligner 430 may be provided in a controller 400 that controls the data driver 300 and the gate driver 200. The calculator 410 may be included in the controller 400, or may be provided independently from the controller 400. The sensing unit 320 may be provided in the data driver 300, or may be provided independently from the data driver 300. Hereinafter, a case where the sensing unit 320 is included in the data driver 300 as illustrated in FIG. 4 and the calculator 410 is included in the controller 400 as illustrated in FIG. 3 will be described as an example of the OLED display apparatus according to an example embodiment of the present invention. In this case, as illustrated in FIG. 5, the data driver 300 may include a data voltage supply unit 310, which supplies various data voltages to the panel 100, and the sensing unit 320. That is, the data voltage supply unit 310 is the same as the data driver 300, but when the sensing unit 320 is included in the data driver 300, for convenience of a description, the data driver 300 may be referred to as the data voltage supply unit 310. However, the panel driver applied to the OLED display apparatus according to an example embodiment of the present invention may be implemented in various structures in addition to a structure to be described below.

The controller 400 may generate a gate control signal GCS for controlling the gate driver 200 and a data control signal DCS for controlling the data driver 300, based on a timing sync signal TSS supplied from the external system (not shown).

Moreover, in the sensing mode where sensing for external compensation is performed, the controller 400 may transfer sensing image data, which are to be supplied to a plurality of pixels provided on a horizontal line which external compensation is performed, to the data driver 300. The sensing for external compensation may be performed at various timings. Hereinafter, however, a case where external compensation is performed for a blank time between frames will be described as an example of the present invention. In the sensing mode, the controller 400 may calculate the external compensation value, based on sensing data Sdata supplied from the data driver 300 and store the external compensation value in a memory 450. The memory 450 may be included in the controller 400, or may be implemented independently from the controller 400. A detailed method of performing, by the controller 400, sensing for external compensation will be described below in detail with reference to the drawings.

In the display mode where an image is displayed, when input image data is performed is received, the controller 400 may perform external compensation on the input image data to convert the input image data into external compensation image data according to a calculator control signal transferred from the calculator 410, based on the external compensation value. Alternatively, the controller 400 may realign the input image data to convert the input image data into normal image data without performing external compensation on the input image data, and output the normal image data.

To perform the above-description function, as illustrated in FIG. 4, the controller 300 may include: the data aligner 430 that realigns pieces of input image data transferred from the external system (not shown) by using the timing sync signal transferred from the external system (not shown) to supply pieces of output image data to the data driver 300; a control signal generator 420 that generates the gate control signal GCS, the data control signal DCS, and a power control signal PCS, based on the timing sync signal; the calculator 410 that calculates, by using the median filter, calculation data including characteristic information of a non-sensing subpixel which is not sensed among the plurality of subpixels, based on the sensing data and calculates an external compensation value, based on the sensing data and the calculation data; the memory 450 that stores the external compensation value; and an output unit 440 that outputs various pieces of output image data generated by the data aligner 430 and various control signals generated by the data aligner 430 to the data driver 300 or the gate driver 200.

The calculator 410 may calculate calculation data corresponding to each of the non-sensing subpixels, based on the sensing data. The calculator 410 may determine a characteristic change of each subpixel, based on the sensing data and the calculation data and calculate the external compensation value. For example, in the sensing mode, the calculator 410 may sense a characteristic change of each of a plurality of the organic light emitting diodes OLED by using the pieces of sensing data Sdata and the calculation data, calculate the external compensation value, based on the characteristic change, and store the external compensation value in the memory 450. A method of calculating, by the calculator 410, the calculation data will be described below in detail with reference to the drawings.

In the display mode, the data aligner 430 may realign the pieces of input image data so as to match a structure of the subpixels 110 and may supply pieces of output image data, generated through the realignment, to the data driver 300. Particularly, the data aligner 430 may correct the pieces of input image data, based on the external compensation value.

For example, in the display mode where an image is displayed, when input image data corresponding to a subpixel for which external compensation is not required is received, the data aligner 430 may realign the input image data to generate normal image data, and when input image data corresponding to a subpixel for which the external compensation is required is received, the data aligner 430 may compensate for the input image data to generate compensation image data, based on the external compensation value.

That is, in the display mode, when the external compensation for the input image data is required, the data aligner 430 may convert the input image data into the external compensation image data, based on the external compensation value, and when the external compensation for the input image data is not required, the data aligner 430 may realign the input image data according to a structure of the panel 100 to convert the input image data into the normal image data.

Therefore, in the display mode, the data aligner 430 may generate the external compensation image data and the normal image data. A generic name for the external compensation image data and the normal image data is output image data.

Hereinabove, image data for which external compensation is not required is referred to as normal image data. However, in the present invention, there may be no image data for which external compensation is not performed. For example, the present invention may calculate an external compensation value for all subpixels, based on the sensing values collected through the sensing operation and compensate for all input image data according to the external compensation value. In this case, output image data which is output from the data aligner 430 may be external compensation image data.

The control signal generator 420 may generate various control signals according to an example embodiment of the present invention.

As described above, the memory 450 may store the external compensation value transferred from the calculator 410 and may transfer the stored compensation value and external compensation value to the data aligner 430.

In response to the gate control signal GCS supplied from the controller 400, the gate driver 200 may sequentially generate the first scan pulse SP1 and may sequentially supply the first scan pulse SP1 to the scan control lines SCL. In response to the gate control signal GCS, the gate driver 200 may sequentially generate the second scan pulse SP2 and may sequentially supply the second scan pulse SP2 to the sensing control lines SSCL. Here, the gate control signal GCS may include a start signal and a plurality of clock signals.

The gate driver 200 may be directly provided in the panel 100 in a process of forming a TFT of each subpixel P. Alternatively, the gate driver 200 may be implemented in an integrated circuit (IC) type and may be equipped in the panel 100.

The data driver 300 may be connected to the data lines DL1 to DLd and the sensing lines SL1 to SLd and may operate in the sensing mode or the display mode according to the control signal transferred from the controller 400. When the data driver 300 includes the data voltage supply unit 310 and the sensing unit 320 as illustrated in FIG. 5, the data voltage supply unit 310 may be connected to the data lines DL, and the sensing unit 320 may be connected to the sensing lines SL.

In the sensing mode, the sensing unit 320 may supply the reference voltage Vref to each of the sensing lines SL1 to SLk, receive a signal corresponding to the reference voltage Vref, and sense a characteristic change of the driving transistor Tdr included in each of a plurality of subpixels P provided on one horizontal line according to the received signal to generate sensing data Sdata.

The sensing unit 320 may supply the generated sensing data Sdata to the controller 400.

To this end, the subpixels P may be configured as illustrated in FIG. 6.

For example, one sensing line SL may be provided for each unit pixel 120 including R, G, B, and W subpixels 110 among a plurality of subpixels provided on one horizontal line. Therefore, when one sensing data voltage is supplied through each sensing line SL, sensing data for one subpixel of each unit pixel 120 may be transferred to the sensing unit 320. A method of sensing, by the sensing unit 320, the subpixels 110 will be described in detail with reference to FIGS. 13A to 15D.

In the sensing mode, the data voltage supply unit 310 may convert the output image data (i.e., the sensing image data), transferred from the controller 400, into a sensing data voltage and supply the sensing data voltage to the data line DL. A characteristic change of a driving transistor, included in a subpixel to which the sensing data voltage is supplied, may be transferred to the sensing unit 320 through the sensing line SL.

In the display mode, the data voltage supply unit 310 may convert the output image data DATA, which is supplied from the controller 400 in units of one horizontal line, into a data voltage by using a plurality of gamma reference voltages supplied from a reference gamma voltage supply unit (not shown) and supply the data voltage to a corresponding data line DL. In the display mode, the output image data DATA transferred to the data voltage supply unit 310 may be the external compensation image data or the compensation image data.

That is, the data voltage supply unit 310 may sample the output image data DATA of each subpixel P, which is input in units of one horizontal line, according to the data control signal DCS and select, as the data voltage, a gamma voltage corresponding to a grayscale value of sampling data among the plurality of reference gamma voltages to supply the selected data voltage to the data line DL of a corresponding subpixel P.

In the sensing mode, the sensing unit 320 may sense a voltage or a current of each of the sensing lines SL1 to SLk, generate sensing data Sdata corresponding to the sensed voltage or current, and supply the sensing data Sdata to the controller 400. To this end, the sensing unit 320 may include an analog-to-digital converter (ADC) that converts a sensing voltage or a sensing current, transferred through a corresponding sensing line, into a digital signal to generate the sensing data Sdata.

The sensing unit 320 may perform the sensing during the blank time, which is provided between frames and where data voltages are not output to the data lines DL, or a turn-off time where the organic light emitting display apparatus is turned off. For example, when an electronic device such as a monitor, a television (TV), a smartphone, a tablet personal computer (PC), or the like equipped with the organic light emitting display apparatus is turned off, an external system for driving the electronic device may generate a turn-off signal and transfer the turn-off signal to the controller 400 or the sensing unit 320. When a turn-off signal is received from the external system or the controller 400, the sensing unit 320 may perform the sensing.

Figure 8:
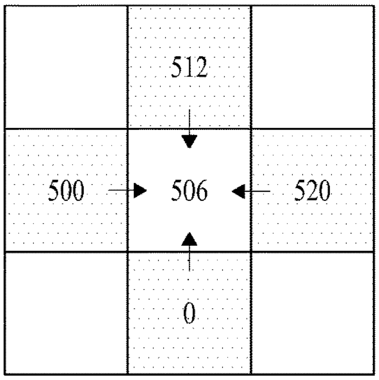
FIG. 8 Prior Art
FIG. 8 is an exemplary diagram for describing a basic operation principle where an organic light emitting display apparatus according to an example embodiment of the present invention calculates calculation data with a median filter.
Figure 9:
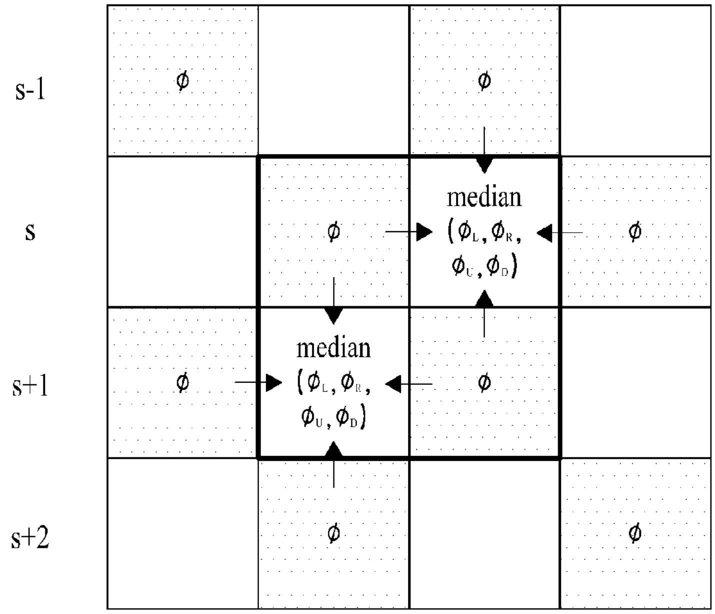
FIG. 9 is an exemplary diagram for describing a first example embodiment of a method of calculating, by an organic light emitting display apparatus according to an example embodiment of the present invention, calculation data.
Figure 9:
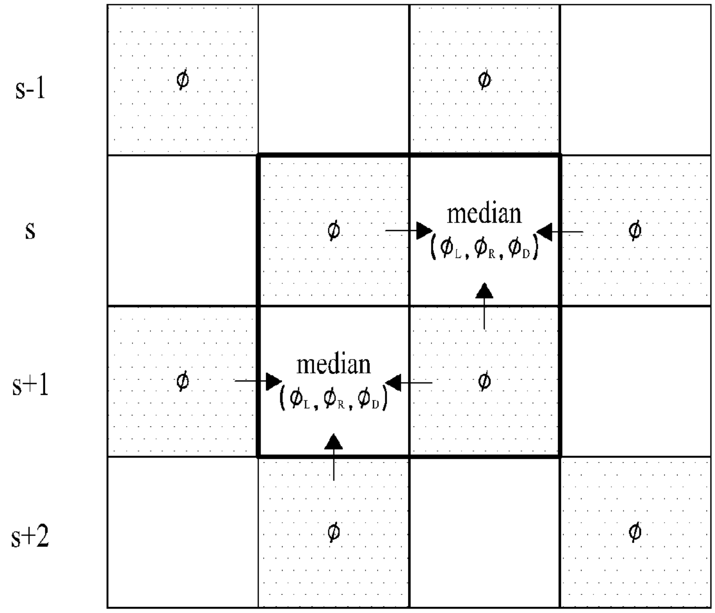
Figure 10:
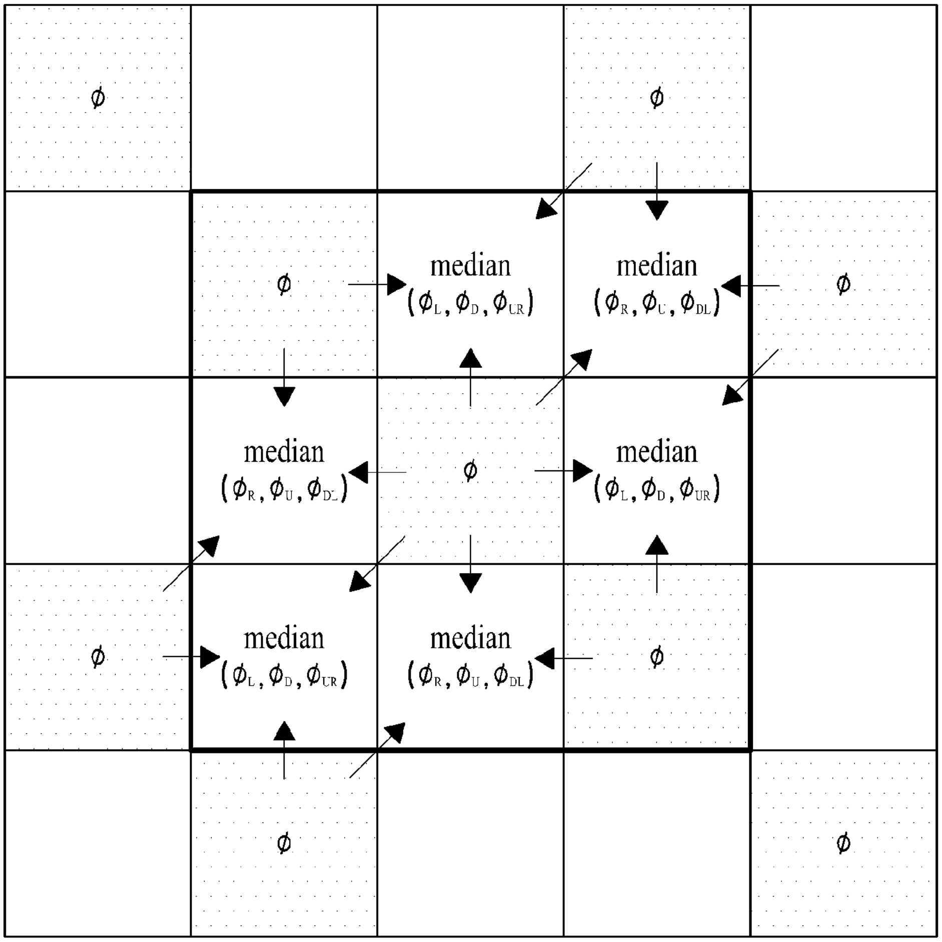
FIG. 10 is an exemplary diagram for describing a second example embodiment of a method of calculating, by an organic light emitting display apparatus according to an example embodiment of the present invention, calculation data.
Figure 11:
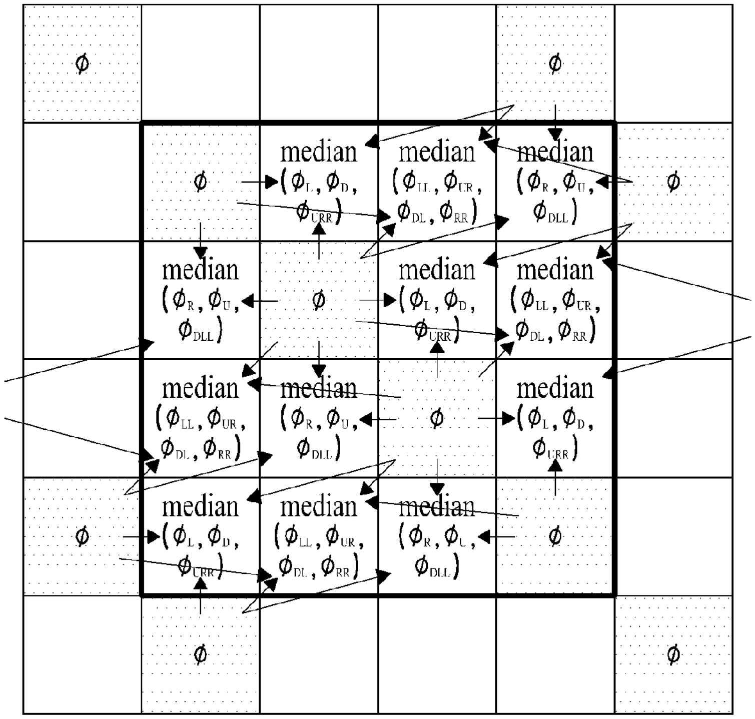
FIG. 11 is an exemplary diagram for describing a third example embodiment of a method of calculating, by an organic light emitting display apparatus according to an example embodiment of the present invention, calculation data.
Figure 11:
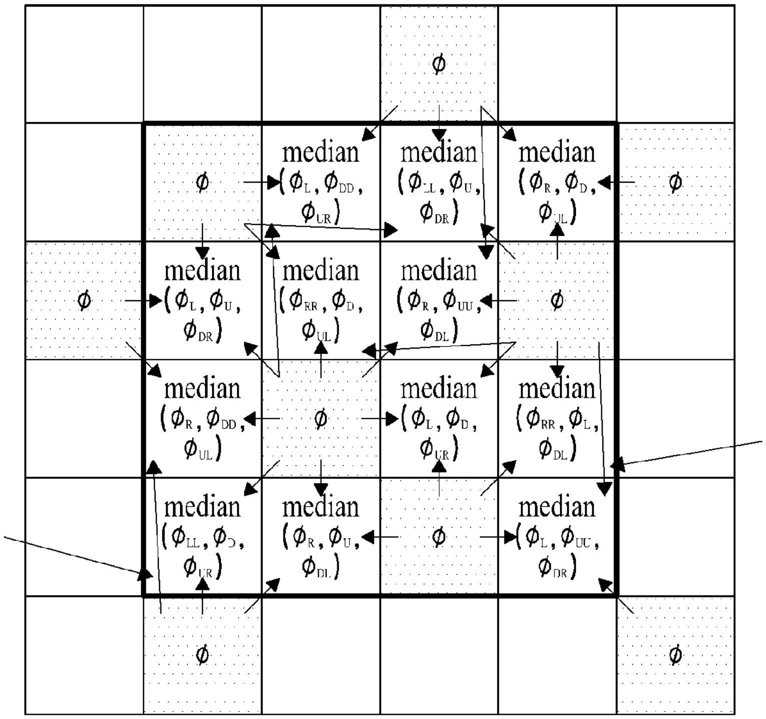

FIG. 8 is an exemplary diagram for describing a basic operation principle where an organic light emitting display apparatus according to an example embodiment of the present invention calculates calculation data with a median filter. FIG. 9 is an exemplary diagram for describing a first example embodiment of a method of calculating, by an organic light emitting display apparatus according to an example embodiment of the present invention, calculation data. FIG. 10 is an exemplary diagram for describing a second example embodiment of a method of calculating, by an organic light emitting display apparatus according to an example embodiment of the present invention, calculation data. FIG. 11 is an exemplary diagram for describing a third example embodiment of a method of calculating, by an organic light emitting display apparatus according to an example embodiment of the present invention, calculation data.

The median filter may be generally used to remove noise along with a mean filter.

If N pieces of data are provided, the mean filter may calculate a mean value of the N pieces of data to generate one piece of data.

However, the median filter may finally generate one piece of data, based on pieces of data other than a minimum value or a maximum value of the N pieces of data.

For example, as illustrated in FIG. 8, if four pieces of data "500", "512", "520" and "0" are provided, the median filter may calculate one piece of data "506", based on a mean value of two pieces of data "500" and "512" other than a maximum value "520" and a minimum value "0".

Content of the median filter is technology disclosed in patent documents, such as Korean Patent Publication Nos. 10-2012-0032132, 10-2014-0076085, and 10-2009-0018012, and other various papers, and thus, its detailed description is not provided.

Next, a first example embodiment of a method of calculating, by the organic light emitting display apparatus according to an example embodiment of the present invention, calculation data will be described in detail with reference to FIG. 9.

First, as illustrated in portion (a) of FIG. 9, a first method according to the first example embodiment may calculate calculation data for a unit block including four blocks. Particularly, to calculate calculation data of a block (a block illustrated as a median) having no pre-measured data among the four blocks, the first method may use data of blocks which are provided on a horizontal line where the block is provided, a horizontal line provided on the block, and a horizontal line provided under the block. In this case, four pieces of data may be used for calculating the calculation data of the block.

When it is assumed that the block is a subpixel, the pre-measured data may be sensing data that includes a change amount of a threshold voltage or a mobility of a driving transistor included in the subpixel. In portions (a) and (b) of FIG. 9, the sensing data is illustrated as Φ.

In FIG. 9, in the first method according to the first example embodiment, the four pieces of data used to calculate the calculation data of the block are respectively illustrated as ΦL (left sensing data), ΦR (right sensing data), ΦU (up sensing data), and ΦD (down sensing data).

When it is assumed that the pieces of sensing data are stored in a memory for each of the horizontal lines, in the first example embodiment, the calculation data may be calculated based on pieces of sensing data of three horizontal lines. Therefore, if the first method is applied, the display apparatus may include a memory for storing the pieces of sensing data of the three horizontal lines.

Second, as illustrated in portion (b) of FIG. 9, a second method according to the first example embodiment may calculate calculation data for a unit block including four blocks. That is, the second method according to the first example embodiment may use a sensing method which is the same as the sensing method applied to the first method according to the first example embodiment.

However, to calculate calculation data of a block (a block illustrated as a median) having no pre-measured data among the four blocks, the second method according to the first example embodiment may use data of blocks which are provided on a horizontal line, where the block is provided, and a horizontal line provided under the block. In this case, three pieces of data may be used for calculating the calculation data of the block.

For example, as illustrated in portion (b) of FIG. 9, the second method according to the first example embodiment may use ΦL (left sensing data), ΦR (right sensing data), and ΦD (down sensing data) for calculating the calculation data of the block.

When it is assumed that the pieces of sensing data are stored in a memory for each of the horizontal lines, in the second method according to the first example embodiment, the calculation data may be calculated based on pieces of sensing data of two horizontal lines. Therefore, if the second method according to the first example embodiment is applied, the display apparatus may include a memory for storing the pieces of sensing data of the two horizontal lines.

The first example embodiment may be applied to a case where the unit pixel 120 includes a red subpixel, a white subpixel, a green subpixel, and a blue subpixel.

A position of a subpixel corresponding to three pieces of sensing data used to calculate the calculation data in the first method according to the first example embodiment may differ from that of a subpixel corresponding to three pieces of sensing data used to calculate the calculation data in the second method according to the first example embodiment.

Moreover, the first method according to the first example embodiment uses pieces of sensing data of three horizontal lines, but the second method according to the first example embodiment uses pieces of sensing data of two horizontal lines.

Next, a second example embodiment of a method of calculating, by the organic light emitting display apparatus according to an example embodiment of the present invention, calculation data will be described in detail with reference to FIG. 10.

In the second example embodiment of the method of calculating calculation data, as illustrated in portion (a) of FIG. 9, calculation data may be calculated for a unit block including nine blocks. Particularly, to calculate calculation data of a block (a block illustrated as a median) having no pre-measured data among the nine blocks, the method may use data of blocks which are provided on a horizontal line where the block is provided, a horizontal line provided on the block, and a horizontal line provided under the block. In this case, three pieces of data may be used for calculating the calculation data of the block.

When it is assumed that the block is a subpixel, the pre-measured data may be sensing data that includes a change amount of a threshold voltage or a mobility of a driving transistor included in the subpixel. In FIG. 10, the sensing data is illustrated as Φ.

Moreover, in the second example embodiment, positions of three pieces of sensing data used to calculate the calculation data of the block may be variously changed depending on a position of the block as illustrated in FIG. 10.

For example, ΦL (left sensing data), ΦD (down sensing data), and ΦUR (up right sensing data) may be used for calculating calculation data of a block which is disposed at a center of a second horizontal line. However, ΦR (right sensing data), ΦU (up sensing data), and ΦDL (down left sensing data) may be used for calculating calculation data of a block which is disposed at a center of a fourth horizontal line.

When it is assumed that the pieces of sensing data are stored in a memory for each of the horizontal lines, in the second example embodiment, the calculation data may be calculated based on pieces of sensing data of three horizontal lines. Therefore, if the second example embodiment is applied, the display apparatus may include a memory for storing the pieces of sensing data of the three horizontal lines.

The second example embodiment may be applied to a case where the unit pixel 120 includes a red subpixel, a white subpixel, a green subpixel, and a blue subpixel.

Finally, a third example embodiment of a method of calculating, by the organic light emitting display apparatus according to an example embodiment of the present invention, calculation data will be described in detail with reference to FIG. 11.

First, as illustrated in portion (a) of FIG. 11, a first method according to the third example embodiment may calculate calculation data for a unit block including sixteen blocks. Particularly, to calculate calculation data of a block (a block illustrated as a median) having no pre-measured data among the sixteen blocks, the first method may use data of blocks which are provided on a horizontal line where the block is provided, a horizontal line provided on the block, and a horizontal line provided under the block. In this case, three pieces of data may be used for calculating the calculation data of the block.

When it is assumed that the block is a subpixel, the pre-measured data may be sensing data that includes a change amount of a threshold voltage or a mobility of a driving transistor included in the subpixel. In portions (a) and (b) of FIG. 11, the sensing data is illustrated as Φ.

Moreover, in the first method according to the third example embodiment, a position of a block corresponding to three pieces of sensing data used to calculate the calculation data of the block may be variously changed depending on a position of a block from which the calculation data is to be calculated.

When it is assumed that the pieces of sensing data are stored in a memory for each of the horizontal lines, the first method may calculate the calculation data, based on pieces of sensing data of three horizontal lines. Therefore, if the first method is applied, the display apparatus may include a memory for storing the pieces of sensing data of the three horizontal lines.

Second, as illustrated in portion (b) of FIG. 11, a second method according to the third example embodiment may calculate calculation data for a unit block including sixteen blocks. That is, the second method according to the third example embodiment may use a sensing method which is the same as the sensing method applied to the first method according to the third example embodiment.

Therefore, three pieces of data may be used for calculating the calculation data of the block.

Moreover, in the second method according to the third example embodiment, a position of a block corresponding to three pieces of sensing data used to calculate the calculation data of the block may be variously changed depending on a position of a block from which the calculation data is to be calculated.

Moreover, the second method according to the third example embodiment of the present invention may use pieces of data of blocks provided on three horizontal lines, for calculating calculation data of a block (a block illustrated as a median) having no pre-measured data among sixteen unit blocks.

However, a horizontal line where a block supplying the sensing data to the block is not provided may be disposed between a horizontal line, where the block is provided, and one of two horizontal lines except the horizontal line where the block is provided.

Therefore, when it is assumed that the pieces of sensing data are stored in a memory for each of the horizontal lines, in the second method according to the third example embodiment, the calculation data may be calculated based on pieces of sensing data of three horizontal lines. Although the second method according to the third example embodiment uses pieces of sensing data of one horizontal line, as described above, since a horizontal line where a block supplying the sensing data to the block is not provided may be disposed between a horizontal line, where the block is provided, and one of two horizontal lines except the horizontal line where the block is provided, a memory may store pieces of sensing data of a total of four horizontal lines in order for the display apparatus to use the pieces of sensing data of the three horizontal lines.

Therefore, if the second method according to the third example embodiment is applied, the display apparatus may include a memory for storing pieces of sensing data of four horizontal lines.

The third example embodiment may be applied to a case where the unit pixel 120 includes a red subpixel, a white subpixel, a green subpixel, and a blue subpixel.

In the first method and the second method according to the third example embodiment, a position of a subpixel corresponding to three pieces of sensing data used to calculate the calculation data may be variously changed.

Moreover, the first method according to the third example embodiment uses pieces of sensing data of three horizontal lines, but the second method according to the third example embodiment uses pieces of sensing data of four horizontal lines.

Figure 12:
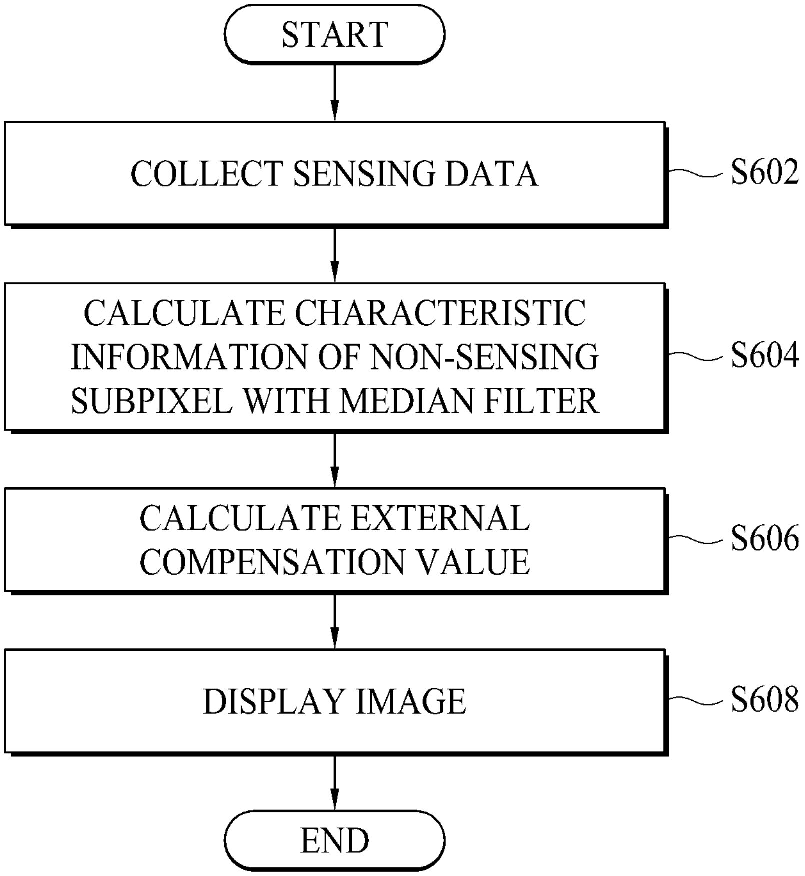
FIG. 12 is a flowchart of a method of driving an organic light emitting display apparatus according to an example embodiment of the present invention.
Figure 13:
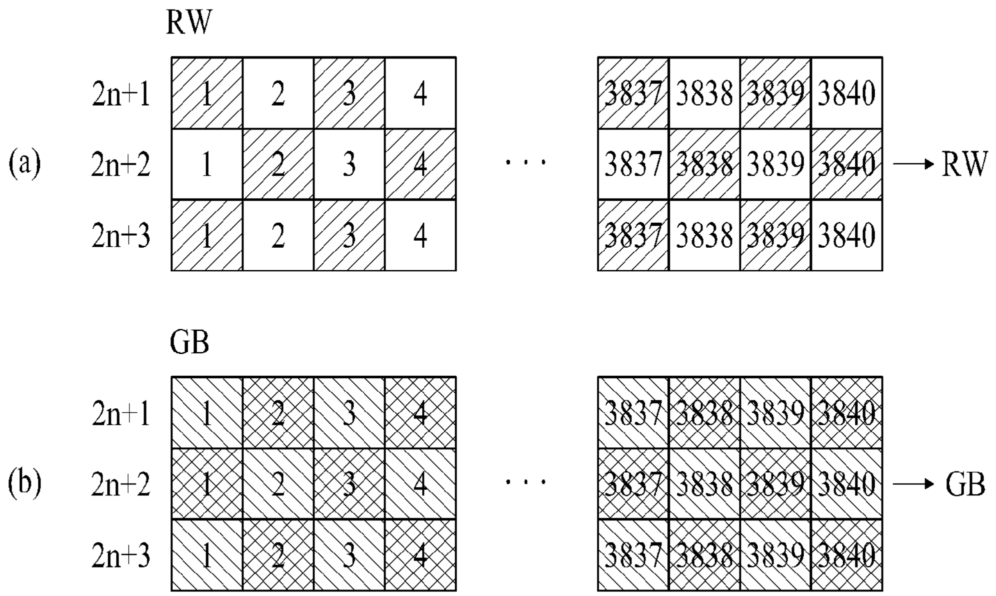
FIGS. 13 and 14 are exemplary diagrams for describing a first example embodiment of a method of calculating, by an organic light emitting display apparatus according to an example embodiment of the present invention, calculation data.
Figure 14:
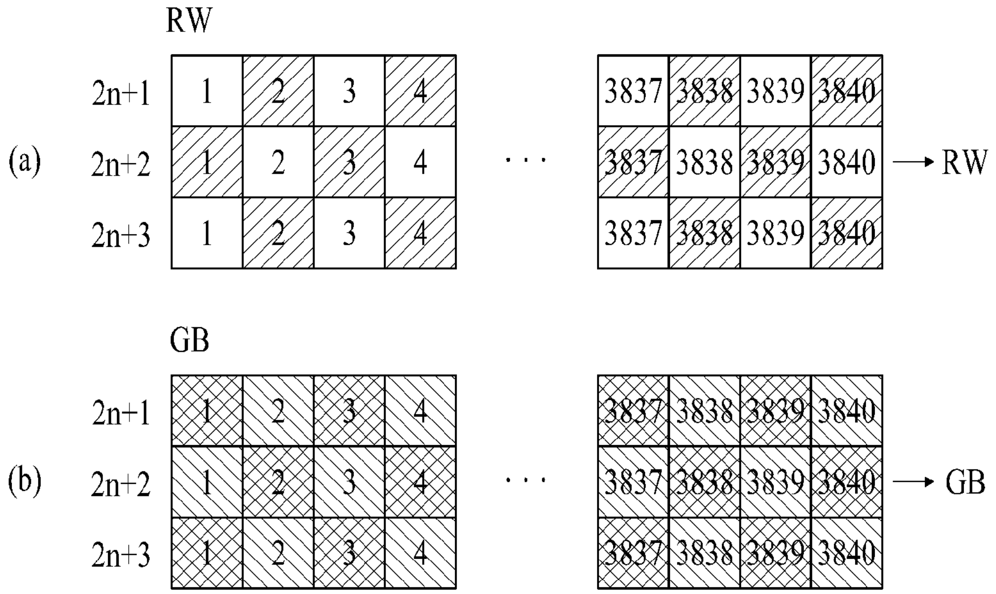
Figure 15:
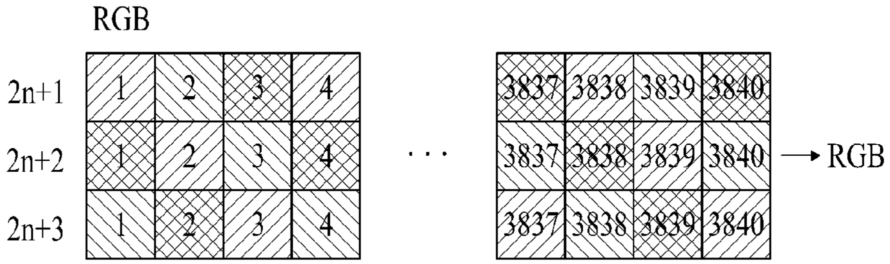
FIGS. 15 to 17 are exemplary diagrams for describing a second example embodiment of a method of calculating, by an organic light emitting display apparatus according to an example embodiment of the present invention, calculation data.
Figure 16:
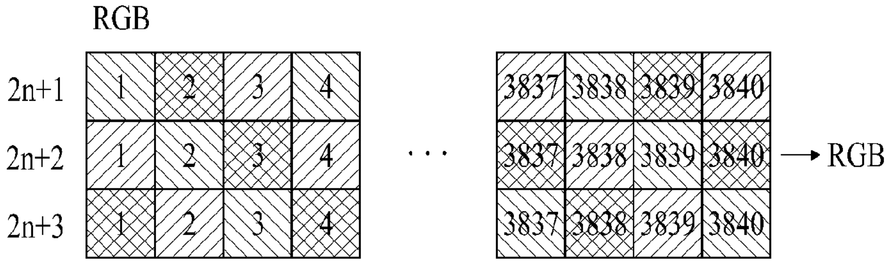
Figure 17:
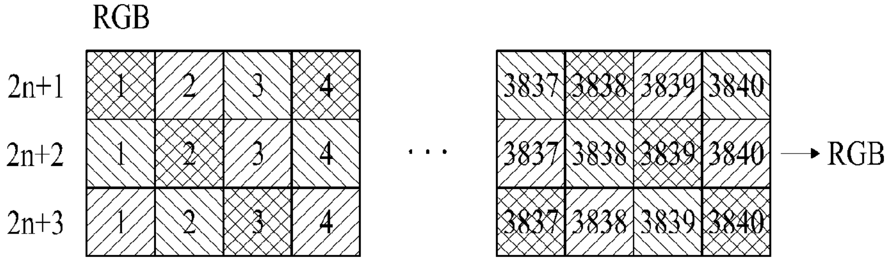

FIG. 12 is a flowchart of a method of driving an organic light emitting display apparatus according to an example embodiment of the present invention. FIGS. 13 and 14 are exemplary diagrams for describing a first example embodiment of a method of calculating, by an organic light emitting display apparatus according to an example embodiment of the present invention, calculation data. FIGS. 15 to 17 are exemplary diagrams for describing a second example embodiment of a method of calculating, by an organic light emitting display apparatus according to an example embodiment of the present invention, calculation data. FIGS. 18 to 21 are exemplary diagrams for describing a third example embodiment of a method of calculating, by an organic light emitting display apparatus according to an example embodiment of the present invention, calculation data.

First, in the sensing mode, data voltages may be sequentially supplied to a plurality of subpixels configuring one unit pixel 120, and characteristic changes of respective driving transistors included in the plurality of subpixels may be sensed. That is, in operation S602, pieces of sensing data may be collected by performing sensing for external compensation for each of a plurality of horizontal lines.

In this case, as illustrated in FIG. 6, one sensing line may be provided in the unit pixel 120. That is, while the reference voltage is being applied to the one sensing line, a data voltage may be supplied to only one of the plurality of subpixels configuring the unit pixel 120, and thus, a characteristic change of a driving transistor included in the one subpixel to which the data voltage is supplied may be sensed.

The sensing mode may be executed during the blank time between frames. During the blank time, a data voltage may not be supplied to the data lines. Also, the sensing mode may be executed during the turn-off time where the organic light emitting display apparatus is turned off.

First, in a first example embodiment of the present invention, as illustrated in portion (a) of FIG. 13, during a sensing period of a kth frame, the sensing unit 320 may sense a first subpixel corresponding to a first color to collect sensing data in a 2m+1st unit pixel of a plurality of unit pixels which are provided on a 2n+1st horizontal line, and sense a second subpixel corresponding to a second color to collect sensing data in a 2m+2nd unit pixel. Here, n is a natural number equal to or more than 0, and m is a natural number equal to or more than 0.

For example, it is assumed that the first color is red (R), the second color is white (W), a third color is green (G), and a fourth color is blue (B). Also, in FIG. 13, one block denotes a unit pixel. Particularly, in one unit pixel illustrated in FIG. 13, only a subpixel corresponding to one color may be sensed through one sensing operation. In this case, one unit pixel is wholly illustrated in a color of a sensed subpixel. The above-described details may be applied to FIGS. 14 to 21 to be described below.

In this case, when the sensing period of the kth frame arrives, as illustrated in portion (a) of FIG. 13, the sensing unit 320 may sense a plurality of first subpixels corresponding to the first color R to collect pieces of sensing data in the 2m+1st unit pixel of the plurality of unit pixels which are provided on the 2n+1st horizontal line, and sense a plurality of second subpixels corresponding to the second color W to collect pieces of sensing data in the 2m+2nd unit pixel. Therefore, the first subpixels and the second subpixels may be sequentially sensed in each of the plurality of unit pixels provided on the 2n+1st horizontal line.

The sensing unit 320 may sense a plurality of second subpixels corresponding to the second color W to collect pieces of sensing data in a 2m+1st unit pixel of a plurality of unit pixels which are provided on a 2n+2nd horizontal line, and sense a plurality of first subpixels corresponding to the first color R to collect pieces of sensing data in a 2m+2nd unit pixel.

When the panel 100 is an UHD panel, namely, when 2,160 horizontal lines are provided in the panel 100, the above-described operation may be repeated 1,080 times, and thus, sensing for the first subpixels and the second subpixels may be performed. That is, the first subpixels and the second subpixels provided in the panel 100 may be sensed through a 2,160-time sensing operation. In this case, all of the first subpixels and the second subpixels may not be sensed. That is, the second subpixels included in the 2m+1st unit pixel on the 2n+1st horizontal line may not be sensed, and the first subpixel included in the 2m+2nd unit pixel may not be sensed. A sensed subpixel may be referred to as a sensing subpixel, and an unsensed subpixel may be referred to as a non-sensing subpixel.

When the first subpixels and the second subpixels are sensed through the above-described operation, as illustrated in portion (b) of FIG. 13, the sensing unit 320 may sense a plurality of third subpixels corresponding to the third color G to collect pieces of sensing data in the 2m+1st unit pixel of the plurality of unit pixels which are provided on the 2n+1st horizontal line, and sense a plurality of fourth subpixels corresponding to the fourth color B to collect pieces of sensing data in the 2m+2nd unit pixel. Therefore, the third subpixels and the fourth subpixels may be sequentially sensed in each of the plurality of unit pixels provided on the 2n+1st horizontal line.

The sensing unit 320 may sense a plurality of fourth subpixels corresponding to the fourth color B to collect pieces of sensing data in the 2m+1st unit pixel of the plurality of unit pixels which are provided on the 2n+2nd horizontal line, and sense a plurality of first subpixels corresponding to the third color G to collect pieces of sensing data in the 2m+2nd unit pixel. Pieces of sensing data of a 2n+3rd horizontal line may be collected by a method which is the same as the method applied to the 2n+1st horizontal line.

When the panel 100 is the UHD panel, the third subpixels and the fourth subpixels provided in the panel 100 may be sensed through a 2,160-time sensing operation.

Therefore, when the panel 100 is the UHD panel, a plurality of subpixels corresponding to the first to fourth colors in all the unit pixels may be sensed through a total 4,320-time (=2160 line×2) sensing operation during one sensing period.

In this case, as described above, there may be a plurality of subpixels that are not sensed for each color.

The pieces of sensing data, as illustrated in portion (a) of FIG. 13, may be stored in the memory in units of a horizontal line.

Second, in a second example embodiment of the present invention, as illustrated in FIG. 15, during a sensing period of a kth frame, the sensing unit 320 may sense a plurality of first subpixels corresponding to a first color to collect pieces of sensing data in a 2m+1 st unit pixel of a plurality of unit pixels which are provided on a 2n+1st horizontal line, sense a plurality of second subpixels corresponding to a second color to collect pieces of sensing data in a 2m+2nd unit pixel, and sense a plurality of third subpixels corresponding to a second color to collect pieces of sensing data in a 2m+3rd unit pixel. For example, it is assumed that the first color is red (R), the second color is green (G), and a third color is blue (B). In the following description, details which are the same as or similar to the details described above in the first example embodiment will be briefly described or are not described.

The sensing unit 320 may sense a plurality of third subpixels to collect pieces of sensing data in a 2m+1st unit pixel of a plurality of unit pixels which are provided on a 2n+2nd horizontal line, sense a plurality of first subpixels to collect pieces of sensing data in a 2m+2nd unit pixel, and sense a plurality of second subpixels to collect pieces of sensing data in a 2m+3rd unit pixel.

The sensing unit 320 may sense a plurality of second subpixels to collect pieces of sensing data in a 2m+1st unit pixel of a plurality of unit pixels which are provided on a 2n+3rd horizontal line, sense a plurality of third subpixels to collect pieces of sensing data in a 2m+2nd unit pixel, and sense a plurality of first subpixels to collect pieces of sensing data in a 2m+3rd unit pixel.

Therefore, when the panel 100 is the UHD panel, a plurality of subpixels corresponding to the first to third colors may be sensed through a 2,160-time (=2160 line×1) sensing operation during one sensing period.

In this case, as described above, there may be a plurality of subpixels that are not sensed for each color.

The pieces of sensing data, as illustrated in FIG. 15, may be stored in the memory in units of a horizontal line.

Figure 18:
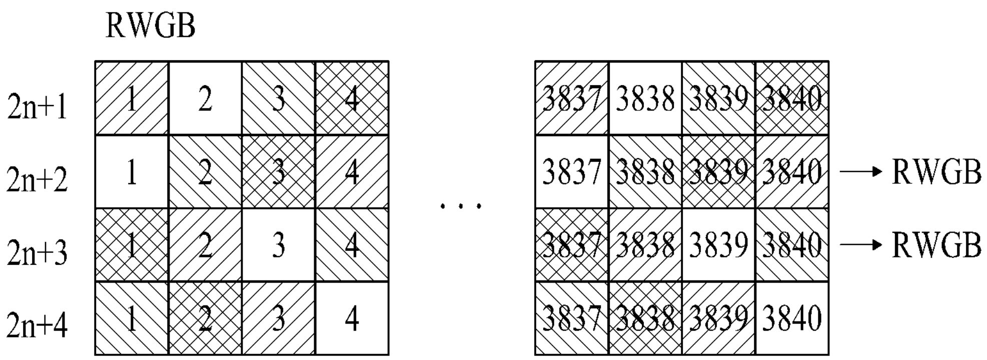
FIGS. 18 to 21 are exemplary diagrams for describing a third example embodiment of a method of calculating, by an organic light emitting display apparatus according to an example embodiment of the present invention, calculation data.

Third, in a third example embodiment of the present invention, as illustrated in FIG. 18, during a sensing period of a kth frame, the sensing unit 320 may sense a plurality of first subpixels corresponding to a first color to collect pieces of sensing data in a 2m+1st unit pixel of a plurality of unit pixels which are provided on a 2n+1st horizontal line, sense a plurality of second subpixels corresponding to a second color to collect pieces of sensing data in a 2m+2nd unit pixel, sense a plurality of third subpixels corresponding to a third color to collect pieces of sensing data in a 2m+3rd unit pixel, and sense a plurality of fourth subpixels corresponding to a fourth color to collect pieces of sensing data in a 2m+4th unit pixel. For example, it is assumed that the first color is red (R), the second color is white (W), the third color is green (G), and the fourth color is blue (B).

During the sensing period of the kth frame, the sensing unit 320 may sense a plurality of second subpixels to collect pieces of sensing data in a 2m+1 st unit pixel of a plurality of unit pixels which are provided on a 2n+2nd horizontal line, sense a plurality of third subpixels to collect pieces of sensing data in a 2m+2nd unit pixel, sense a plurality of fourth subpixels to collect pieces of sensing data in a 2m+3rd unit pixel, and sense a plurality of first subpixels to collect pieces of sensing data in a 2m+4th unit pixel.

During the sensing period of the kth frame, the sensing unit 320 may sense a plurality of fourth subpixels to collect pieces of sensing data in a 2m+1st unit pixel of a plurality of unit pixels which are provided on a 2n+3rd horizontal line, sense a plurality of first subpixels to collect pieces of sensing data in a 2m+2nd unit pixel, sense a plurality of second subpixels to collect pieces of sensing data in a 2m+3rd unit pixel, and sense a plurality of third subpixels to collect pieces of sensing data in a 2m+4th unit pixel.

During the sensing period of the kth frame, the sensing unit 320 may sense a plurality of third subpixels to collect pieces of sensing data in a 2m+1st unit pixel of a plurality of unit pixels which are provided on a 2n+4th horizontal line, sense a plurality of fourth subpixels to collect pieces of sensing data in a 2m+2nd unit pixel, sense a plurality of first subpixels to collect pieces of sensing data in a 2m+3rd unit pixel, and sense a plurality of second subpixels to collect pieces of sensing data in a 2m+4th unit pixel. Here, n is a natural number equal to or more than 0, and m is a natural number equal to or more than 0.

Therefore, when the panel 100 is the UHD panel, a plurality of subpixels corresponding to the first to fourth colors may be sensed through a total 2,160-time (=2160 line×1) sensing operation during one sensing period.

In this case, as described above, there may be a plurality of subpixels that are not sensed for each color.

The pieces of sensing data, as illustrated in FIG. 18, may be stored in the memory in units of a horizontal line.

Subsequently, during the sensing period, when a sensing operation may be performed for the subpixels and thus the pieces of sensing data are collected in S602, by using the median filter, the calculator 410 may calculate calculation data of a plurality of non-sensing subpixels, based on the pieces of sensing data in operation S604.

In this case, the method described above with reference to FIGS. 8 to 11 may be used.

First, in the first example embodiment of the present invention, as illustrated in portion (a) of FIG. 9, by using the median filter, the calculator 410 may calculate calculation data of a non-sensing subpixel provided on an sth horizontal line, based on pieces of sensing data of a plurality of sensing subpixels which are provided on an s−1st horizontal line and sensed, pieces of sensing data of a plurality of sensing subpixels which are provided on the sth horizontal line and sensed, and pieces of sensing data of a plurality of sensing subpixels which are provided on an s+1st horizontal line and sensed. Here, s is a natural number.

As illustrated in portion (b) of FIG. 9, by using the median filter, the calculator 410 may calculate the calculation data of the non-sensing subpixel provided on the sth horizontal line, based on the pieces of sensing data of the plurality of sensing subpixels which are provided on the sth horizontal line and sensed and the pieces of sensing data of the plurality of sensing subpixels which are provided on the s+1st horizontal line and sensed.

Second, in the second example embodiment of the present invention, the calculator 410 may calculate pieces of calculation data of a plurality of non-sensing subpixels by using the method described above with reference to FIG. 10.

Third, in the third example embodiment of the present invention, the calculator 410 may calculate pieces of calculation data of a plurality of non-sensing subpixels by using the method described above with reference to FIG. 11.

That is, the calculator 410 may receive, from the sensing unit 320, pieces of sensing data matching the sensing subpixels among all the subpixels provided in the panel 100. Also, by using the median filter, the calculator 410 may directly calculate pieces of calculation data matching the non-sensing subpixels, based on the pieces of sensing data.

Subsequently, in operation S606, the calculator 410 may calculate the external compensation value, based on the pieces of sensing data and the pieces of calculation data. A detailed method of calculating the external compensation value may use methods disclosed in various patent documents.

Subsequently, in the display mode, when input image data corresponding to a subpixel for which external compensation is not required is received, the data aligner 430 may realign the input image data to generate normal image data.

Moreover, when input image data corresponding to a subpixel for which external compensation is required is received, the data aligner 430 may compensate for the input image data to generate compensation image data, based on the external compensation value.

A method of realigning input image data to generate normal image data or adding a specific compensation value to input image data to generate compensation image data may use a method which is generally used at present. Thus, a detailed description on this is not provided.

The data driver 300 may convert the normal image data into a normal data voltage, convert the compensation image data into a compensation data voltage, and supply the normal data voltage and the compensation data voltage to a corresponding data line provided in the panel 100, thereby displaying an image in the panel 100.

According to the present invention, even when a threshold voltage or a mobility of a driving transistor included in each of the subpixels provided in the panel 100 is changed, the panel 100 is normally driven.

The display apparatus according to an example embodiment of the present invention may additionally change a sensing sequence and sense all the subpixels of the panel 100 to generate pieces of sensing data of all the subpixels.

First, in the first example embodiment of the present invention, as described with reference to FIG. 13, when the panel 100 is the UHD panel, a plurality of subpixels corresponding to the first to fourth colors in all the unit pixels may be sensed through a total 4,320-time (=2160 line×2) sensing operation during one sensing period, namely, a sensing period of a kth frame. In this case, however, as described above, there may be a plurality of subpixels that are not sensed for each color.

During a sensing period of a k+1st frame, as illustrated in FIG. 14, the sensing unit 320 may sense a plurality of non-sensing subpixels, which are not sensed during the sensing period of the kth frame, to collect pieces of sensing data in operation S602.

For example, when the sending period of the k+1st frame arrives, as illustrated in portions (a) and (b) of FIG. 14, the sensing unit 320 may sense the non-sensing subpixels, which are not sensed during the sensing period of the kth frame, to collect pieces of sensing data.

During the sensing period of the kth frame, as illustrated in FIG. 13, the plurality of second subpixels (the second color) and the plurality of fourth subpixels (the fourth color) may not be sensed in the 2m+1st unit pixel provided on the 2n+1st horizontal line, and the plurality of first subpixels (the first color) and the plurality of third subpixels (the third color) may not be sensed in the 2m+2nd unit pixel.

Therefore, the sensing unit 320 may change the order of subpixels which are sensed during the sensing period of the k+1st frame.

In this case, the calculator 410 may calculate pieces of calculation data including characteristic information of the sensing subpixels which are sensed during the sensing period of the kth frame, based on pieces of sensing data which are obtained through sensing during the sensing period of the k+1st frame.

To provide an additional description, during the sensing period of the k+1 st frame, a non-sensing subpixel where the calculation data is arbitrarily calculated with the median filter during the sensing period of the kth frame may be substantially sensed, and thus, the sensing data may be generated. Therefore, during the sensing period of the kth frame, a subpixel where the external compensation value is calculated based on the calculation data may be actually sensed, and thus, sensing data may be generated, whereby the external compensation value may be calculated based on the generated sensing data. Therefore, an accurate external compensation value may be calculated.

By using the above-described method, a 4,320-time (=2160 line×2) sensing operation may be performed in the kth frame, and a 4,320-time (=2160 line×2) sensing operation may be performed in the k+1st frame. Therefore, all the sub-pixels may be substantially sensed through a total 8,640-time sensing operation, and thus, pieces of sensing data of all the subpixels may be generated.

Therefore, an external compensation value of each of the subpixels may be calculated based on actually sensed sensing data once each at every two frames, and thus, an accurate external compensation value is calculated.

Second, in the second example embodiment of the present invention, as described with reference to FIG. 15, when the panel 100 is the UHD panel, a plurality of subpixels corresponding to the first to third colors may be sensed through a 2,160-time (=2160 line×1) sensing operation during one sensing period. In this case, however, as described above, there may be a plurality of subpixels that are not sensed for each color.

Therefore, as illustrated in FIGS. 16 and 17, during the sensing period of the k+1st frame and a sensing period of a k+2nd frame, the sensing unit 320 may sequentially change the order of sensed subpixels in each unit pixel and thus sense all subpixels included in each unit pixel to generate pieces of sensing data.

That is, during the sensing period of the kth to k+2nd frames, the sensing unit 320 may sequentially change the order of sensed subpixels to collect pieces of sensing data from all subpixels of all the unit pixels.

By using the above-described method, during the sensing period of the kth to k+2nd frames, all the subpixels may be substantially sensed through a total 6,480-time (=2160 line×3) sensing operation, and thus, pieces of sensing data of all the subpixels may be generated.

Therefore, an external compensation value of each of the subpixels may be calculated based on actually sensed sensing data once each at every three frames, and thus, an accurate external compensation value is calculated.

Third, in the third example embodiment of the present invention, as described with reference to FIG. 18, when the panel 100 is the UHD panel, a plurality of subpixels corresponding to the first to fourth colors may be sensed through a 2,160-time (=2160 line×1) sensing operation during one sensing period. In this case, however, as described above, there may be a plurality of subpixels that are not sensed for each color.

Figure 19:
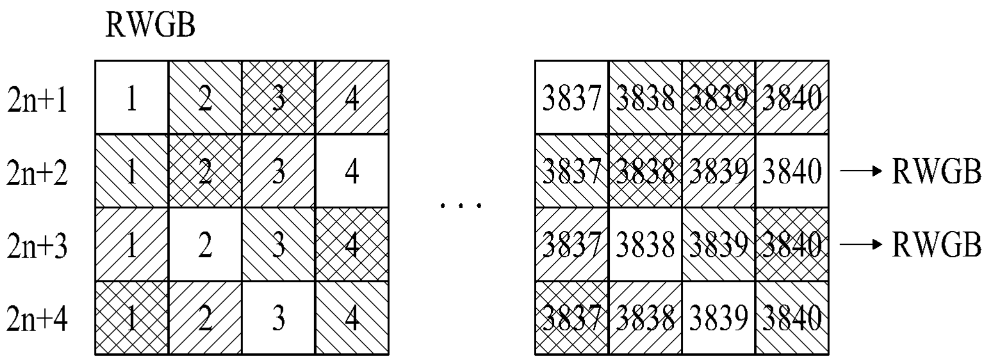
Figure 20:
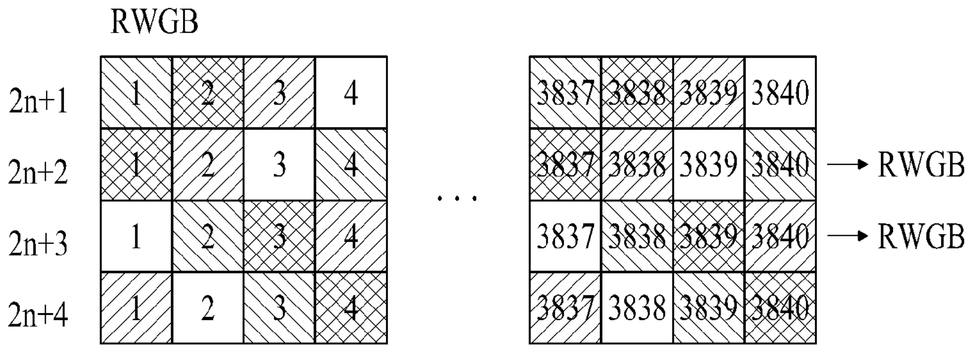
Figure 21:
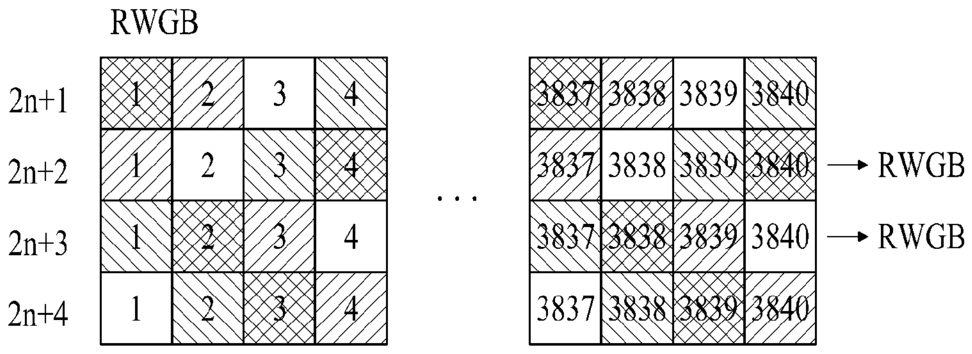

Therefore, as illustrated in FIGS. 19 to 21, during the sensing period of the k+1st to k+3rd frames, the sensing unit 320 may sequentially change the order of sensed subpixels in each unit pixel and thus sense all subpixels included in each unit pixel to generate pieces of sensing data.

That is, during the sensing period of the kth to k+3rd frames, the sensing unit 320 may sequentially change the order of sensed subpixels to collect pieces of sensing data from all subpixels of all the unit pixels.

By using the above-described method, during the sensing period of the kth to k+3rd frames, all the subpixels may be substantially sensed through a total 8,640-time (=2160 line×4) sensing operation, and thus, pieces of sensing data of all the subpixels may be generated.

Therefore, an external compensation value of each of the subpixels may be calculated based on actually sensed sensing data once each at every four frames, and thus, an accurate external compensation value is calculated.

According to the above-described embodiments of the present invention, since all subpixels are not sensed during one sensing period, a sensing period for external compensation is shortened. Also, according to the embodiments of the present invention, an external compensation value may be calculated based on sensing data obtained through sensing which is actually performed once each in units of at least four frames, and thus, a reliable external compensation value is calculated.

As described above, according to the embodiments of the present invention, the sensing period where sensing for real-time external compensation is performed is shortened.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An organic light emitting display apparatus, comprising:

a panel where a plurality of subpixels configuring a unit pixel are provided on each of a plurality of horizontal lines, and sensing for external compensation is performed for each horizontal line;

a sensing unit configured to, when a sensing period arrives, perform the sensing for the external compensation for some of the plurality of subpixels on each horizontal line of the panel to collect sensing data including characteristic information of the some of the plurality of subpixels, the sensing unit including an analog-to-digital converter (ADC) that converts a sensing voltage or a sensing current, transferred through a corresponding sensing line, into a digital signal to generate the sensing data;

a calculator configured to calculate, by using a median filter, calculation data including characteristic information of a non-sensing subpixel which is not sensed among the plurality of subpixels, based on the sensing data, and calculate an external compensation value, based on the sensing data and the calculation data;

a data aligner configured to, when input image data corresponding to a subpixel for which the external compensation is not required is received, realign the input image data to generate normal image data and, when input image data corresponding to a subpixel for which the external compensation is required is received, compensate for the input image data to generate compensation image data, based on the external compensation value; and a data driver configured to convert the normal image data into a normal data voltage, convert the compensation image data into a compensation data voltage, and supply the normal data voltage and the compensation data voltage to a plurality of data lines provided in the panel, wherein each of a plurality of unit pixels includes at least three subpixels, in each of the plurality of unit pixels, there is at least one non-sensing subpixel which is not sensed during one sensing period, and during a sensing period of a kth frame, the sensing unit senses a first subpixel corresponding to a first color or a third subpixel corresponding to a third color to collect sensing data in a (2m+1)st unit pixel of a plurality of unit pixels which are provided on a (2n+1)st horizontal line, and senses a second subpixel corresponding to a second color or a fourth subpixel corresponding to a fourth color to collect sensing data in a (2m+2)nd unit pixel, and the sensing unit senses a second subpixel or a fourth subpixel to collect sensing data in a (2m+1)st unit pixel of a plurality of unit pixels which are provided on a (2n+2)nd horizontal line, and senses a first subpixel or a third subpixel to collect sensing data in a (2m+2)nd unit pixel, where k is a positive integer, m is a non-negative integer, and n is a non-negative integer.

2. The organic light emitting display apparatus of claim 1, wherein the plurality of data lines are provided in a first direction of the panel, a plurality of sensing lines are arranged in parallel with the plurality of data lines, and each of the plurality of sensing lines is connected to at least three subpixels configuring each of a plurality of unit pixels that are provided on one horizontal line.

3. The organic light emitting display apparatus of claim 1, wherein the sensing unit performs the sensing during a blank time, which is provided between frames and where an image is not displayed, or a turn-off time where a turn-off signal is received from an external system.

4. The organic light emitting display apparatus of claim 1, wherein by using the median filter, the calculator calculates calculation data of a non-sensing subpixel provided on an sth horizontal line, based on pieces of sensing data of a plurality of sensing subpixels which are provided on an (s−1)st horizontal line and sensed, pieces of sensing data of a plurality of sensing subpixels which are provided on the sth horizontal line and sensed, and pieces of sensing data of a plurality of sensing subpixels which are provided on an (s+1)st horizontal line and sensed, or the calculator calculates the calculation data of the non-sensing subpixel provided on the sth horizontal line, based on the pieces of sensing data of the plurality of sensing subpixels which are provided on the sth horizontal line and sensed and the pieces of sensing data of the plurality of sensing subpixels which are provided on the (s+1)st horizontal line and sensed, where s is a positive integer.

5. The organic light emitting display apparatus of claim 1, wherein during a sensing period of a (k+1)st frame, the sensing unit senses a plurality of non-sensing subpixels, which are not sensed during the sensing period of the kth frame, to collect pieces of sensing data, and the calculator calculates pieces of calculation data including characteristic information of a plurality of sensing subpixels which are sensed during the sensing period of the kth frame, based on pieces of sensing data which are obtained through sensing during the sensing period of the (k+1)st frame.

* * * * *